UNITED STATES PATENT OFFICE 2,610,116

HERBICIDE AND DEFOLIANT

Lyle D. Goodhue and Carolyn E. Tissol, Bartlesville, Okla., assignors to Phillips Petroleum Company, a corporation of Delaware No Drawing. Application January 4, 1950, Serial No. 136,840

14 Claims. (Cl. 71—2.5)

This invention relates to methods and compositions for killing weeds. In some of its embodiments the invention pertains to the defoliation of plants.

The economic value of agricultural chemicals has only recently come to be widely realized. For example, one of the newest fields to become important is that of herbicides, which permit rapid destruction of plant growth where required. Defoliation of plants for various purposes, especially to aid in harvesting, also shows great potential promise. Some of the most important factors in evaluating a material for such uses are cost of the material, effectiveness per unit weight, selectivity, ease of application, and toxicity towards non-plant life.

An object of this invention is to provide new methods of killing weeds. Another object of the invention is to provide new methods of defoliating plants. A further object is to provide highly effective herbicidal compositions. Another object is to provide compositions suitable for use in the defoliation of plants. One specific object of the invention is to defoliate cotton plants permitting easier pulling of the bolls. Yet another object is to make herbicidal and defoliant compositions from relatively inexpensive raw materials. A still further object is to provide herbicides effective in very low dosages. Other objects and advantages of the invention will become apparent, to those skilled in the art, from the accompanying disclosure and discussion.

We have now discovered that 2,3,4,5-bis ($\Delta^2$-butenylene)-tetrahydrofurfural and derivatives thereof are effective herbicidal agents for the eradication of noxious or undesirable weeds when applied thereto in any suitable form such as solutions, emulsions, creams, as the pure compound or concentrate thereof. These materials are also effective as defoliants when applied in proper dosages. By way of example, we have found that it is convenient to dissolve 2,3,4,5-bis ($\Delta^2$-butenylene)-tetrahydrofurfural in a solvent or otherwise employ it in a suitable carrier and apply the composition so formed. Solvents or carriers which we have found applicable to the present invention include those which are substantially inert with respect to the active herbicidal ingredient. Among those materials which are useful for this purpose are kerosene, naphthas, and hydrocarbons boiling preferably above atmospheric temperatures, petrolatum, polybutadiene and others. In some instances it may be desirable to employ a solvent medium or carrier which in itself displays a toxic effect on higher plant life and thus gain the benefit of the toxicity of both substances at a single application. One preferred example of such a carrier having some herbicidal activity is a recycle cracked gas oil, which term refers to gas oil which has at least once been subjected to thermal or catalytic cracking conditions forming lower boiling hydrocarbons, the gas oil remaining uncracked normally being recycled to the cracking step but having been made somewhat more aromatic and refractory towards cracking.

If the active herbicidal ingredient is used in a medium having substantially no toxic properties, such as petrolatum or Soltrol 140 (properties described hereinafter in Example I), the lower effective limit appears to be about one weight per cent. However, when a toxic solvent is employed, the concentration may be correspondingly decreased. In this case the lower limit seems to be about 0.1 weight per cent. We prefer to use a composition containing at least one weight per cent of 2,3,4,5-bis ($\Delta^2$-butenylene)-tetrahydrofurfural as a minimum concentration whether or not the solvent happens to display herbicidal activity. There is no upper limit to the concentration, except that dictated by economy. About 10 per cent is usually quite adequate, though 25 per cent or even more can be used. Of course various adjuvants can be included in the compositions, for example hygroscopic and/or adhesive materials adapted to help hold the active ingredient on the plant on evaporation of solvent. Another suitable method of application is the use of an aqueous emulsion. The concentrations of 2,3,4,5-bis ($\Delta^2$-butenylene)-tetrahydrofurfural just mentioned can be used, and any suitable emulsifying agent can be employed. The emulsion can be made either from the 2,3,4,5-bis ($\Delta^2$-butenylene)-tetrahydrofurfural per se plus water and emulsifying agent, or it can be made from a hydrocarbon solution of 2,3,4,5-bis ($\Delta^2$-butenylene)-tetrahydrofurfural plus water and an emulsifying agent.

The term "weed" is used in the present disclosure in its broadest sense, namely a plant which persists in growing where it is not wanted. The use of the term is broad enough to include not only plants harmful to man or animal such as bull nettle, rag weed and the like, but also otherwise desirable plants such as lawn grasses growing on driveways.

The compositions made in accordance with the present invention may be applied for their intended purpose in several different ways. The most advantageous and presently preferred way, especially when treating large areas, is to spray a liquid composition on the plants to be exterminated. Aerosols could be employed but are generally less satisfactory for our purposes.

The amount of herbicidal composition to be applied will be determined by the method of application. For example when a liquid composition is sprayed on the plants sufficient material should be applied to wet the plants with a minimum amount running from the leaves. In most instances dosages within the range of 5 to 100 pounds herbicide (solvent-free basis) per acre are adequate. If defoliation alone is desired, dosages smaller than lethal are applied. Although it is often immaterial whether or not the plant is killed by a defoliating treatment, as is the case with cotton for example, use of larger than necessary quantities of treating agent is wasteful, and if too much defoliant is administered to a plant the desired falling off of leaves will not occur.

The 2,3,4,5-bis($\Delta^2$-butenylene)tetrahydrofurfural used as the preferred active herbicidal agent of the present invention is a nearly water white liquid having a boiling point of 530 to 550° F. corrected. One method for the production of 2,3,4,5-bis($\Delta^2$-butenylene)-tetrahydrofurfural comprises the inter-reaction of 1,3-butadiene with furfural at a temperature of from 200° F. to 300° F. for from 5 to 100 hours under sufficient pressure to maintain the reactants in liquid phase. This and other suitable conditions and methods for making the compound are disclosed in the copending application of J. C. Hillyer and D. A. Nicewander, Serial No. 81,413, filed March 14, 1949. Reaction of a diolefin such as 1,3-butadiene and its immediate homologues with a furfural such as furfural itself and its immediate homologues produces polycyclic reaction products of varied constitution, which include materials which may broadly be referred to as butadiene-furfural copolymers. There can be isolated from the complex reaction products a compound having the probable formula 2,3,4,5-bis ($\Delta^2$-butenylene)-tetrahydrofurfural, being represented by the probable structural formula:

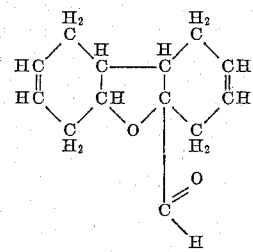

As will appear from the examples hereinbelow, fractions obtained by fractional distillation of furfural-butadiene reaction products, which fractions are composed of polycyclic reaction products including at least some 2,3,4,5-bis ($\Delta^2$-butenylene)-tetrahydrofurfural, exhibit satisfactory herbicidal and defoliant action in accordance with the present invention. Thus, the 2,3,4,5-bis ($\Delta^2$-butenylene)-tetrahydrofurfural known to be an active ingredient need not necessarily be separated in its pure form prior to use. In addition to 1,3-butadiene and furfural as starting reactants, methyl derivatives thereof wherein not more than two carbon atoms of either the butadiene or the furfural has had a hydrogen atom replaced by a methyl group can be used to form the corresponding derivatives of 2,3,4,5-bis ($\Delta^2$-butenylene)-tetrahydrofurfural which are employed in accordance with the present invention. Furthermore chloroprene (2-chloro-1,3-butadiene), 1-chloro-1,3-butadiene and methyl-substituted derivatives thereof wherein not more than one carbon atom has had a hydrogen atom replaced by a methyl group can be reacted with a furfural of the class described to produce the corresponding chlorine-containing derivatives of 2,3,4,5-bis ($\Delta^2$-butenylene)-tetrahydrofurfural which exhibit high herbicidal and defoliant activity. Thus the butadiene starting material is defined by the formula:

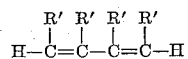

where each R' is hydrogen, methyl, or chloro and at least two R' are hydrogen. The furfural starting material is defined by the formula:

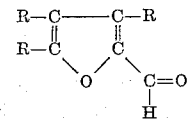

where each R is hydrogen and methyl and at least one R is hydrogen. The most commonly used reactants are 1,3-butadiene and furfural, isoprene and furfural, piperylene and furfural, chloroprene and furfural, and each of these diolefins with methyl furfural. Additional products coming within the scope of this invention are obtained by oxidation of the aldehyde group of any of the above described products to form the carboxylic acid derivative thereof, and by chlorination of any of the foregoing; such chlorination will be largely by addition to double bonds, but some substitutive chlorination can also occur. All of these materials will be described generically herein by the term "a 2,3,4,5-bis ($\Delta^2$-butenylene)-tetrahydrofurfural," and are represented by the formula:

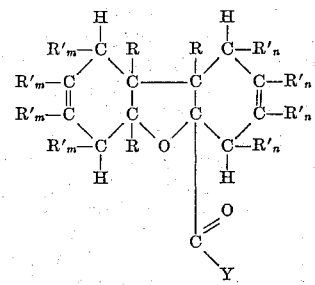

wherein R is a hydrogen or methyl, $R'_m$ is hydrogen or methyl or chloro, $R'_n$ is hydrogen or methyl or chloro, at least one R is hydrogen, at least two $R'_m$ are hydrogen, at least two $R'_n$ are hydrogen, not more than one $R'_m$ is chloro, not more than one $R'_n$ is chloro, Y is hydrogen or —OH or —OM and M is an alkali metal; and chlorinated derivatives thereof containing not over 52 weight per cent total chloride.

The following are examples of herbicidal compositions made according to our invention:

*Example I*

Parts by weight
2,3,4,5-bis ($\Delta^2$-butenylene)-tetrahydrofurfural _____ 5
Soltrol 140 (a low-odor paraffinic naphtha boiling within the range of 360–410° F.) __ 95

*Example II*

Parts by weight
2,3,4,5-bis ($\Delta^2$-butenylene)-tetrahydrofurfural _____ 5
Stoddard solvent _____ 95

Example III

| | Parts by weight |
|---|---|
| 2,3,4,5-bis ($\Delta^2$-butenylene)-tetrahydrofurfural | 5 |
| Petrolatum | 95 |

Example IV

| | Parts by weight |
|---|---|
| 2,3,4,5-bis ($\Delta^2$-butenylene)-tetrahydrofurfural | 5 |
| Lanolin | 95 |

The following examples will serve to illustrate the effectiveness of the compositions of our invention.

Example V

The composition of Example I was sprayed on a field test plot and compared to a control plot sprayed with Soltrol 140. An amount of spray sufficient to wet the leaves of the plants was employed in each case. The plants sprayed with our composition began to change color 30 minutes after the spray was applied and in 12 to 24 hours a complete kill was effected. The control plot was not affected. Weeds killed included ragweed, bull nettle, leafy spurge, pigweed, grasses, and others.

Example VI

The composition of Example II was sprayed on a field test plot where ragweed, bull nettle, leafy spurge, pigweed, wild grasses and others were growing. The plants began to change color 30 minutes after the spray was applied and a complete kill was effected in 12 to 24 hours.

Certain easily grown plants are good indicators of the herbicidal action of chemicals and can be used for the laboratory testing of herbicides. Black Valentine and black wax beans between one and two weeks old were used in the following example.

Example VII

One milligram of 2,3,4,5-bis ($\Delta^2$-butenylene)-tetrahydrofurfural was admixed with 0.5 gram of lanolin. This was sufficient for application to about 10 plants. The method of testing was to cover about one square inch of the leaf of one plant, apply a small amount of the mixture to one side of the petiole of another plant, and to one side of the stem of a third plant. The plants were used just before start of terminal growth.

On a scale rating burning of young bean plants by this method of testing various materials as none, slight, moderate, severe, and very severe, the 2,3,4,5-bis ($\Delta^2$-butenylene)-tetrahydrofurfural mixture was classified as very severe in burning action. It also caused severe dropping of the leaf.

Example VIII

A sample of the 2,3,4,5-bis ($\Delta^2$-butenylene)-tetrahydrofurfural as used in the foregoing examples was converted to its carboxylic acid derivative as follows: Thirty grams was admixed with 35 g. silver oxide, 5 g. sodium hydroxide and 200 ml. water, and allowed to stand for three hours with occasional shaking. It was not heated but became slightly warm to the touch. The reaction mixture was then acidified and the acid recovered.

The sodium salt of this acid was tested by the method described in Example VII, and produced slight burning of the leaf under the test conditions, indicating some phytotoxic effect, though not as much as that of its parent compound.

The use of sprouting rice or radish seeds as an indicator of herbicidal action is reported in the following examples. The method consists in placing a small amount of the material to be tested (1 to 20 mg.) in the center of a nine cm. filter paper previously placed in a 10 cm. petri dish. Five to six cc. of water was added and ten kernels of rice or ten radish seeds were placed in a circle around the chemical. The petri dishes were covered and placed at 70° F. to sprout the seeds. An untreated check group was always prepared and run simultaneously with the tests. The ratio of the growth of the stems and roots in the treated to those in the untreated dishes is used as the criterion. Readings for the following tests were made on the seventh day.

Example IX

On sprouting rice 2,3,4,5-bis ($\Delta^2$-butenylene)-tetrahydrofurfural at five mg. in the petri dish test completely prevented growth. The untreated controls had developed roots between 2.5 and 3.0 inches in length.

Example X

On sprouting radish seed 2,3,4,5-bis ($\Delta^2$-butenylene)-tetrahydrofurfural at ten mg. in the petri dish test completely prevented growth. The untreated controls had developed roots between 2.5 and 3.0 inches in length.

Example XI

On sprouting rice, the sodium salt of the carboxylic acid of 2,3,4,5-bis ($\Delta^2$-butenylene tetrahydrofurfural described in Example VIII partially prevented growth at 5 mg. in the petri dish test. The growth ratios were 0.8 for stem and 0.2 for root. The controls were as in Example IX.

Example XII

On sprouting radish, the same compound (Examples XI and VIII) completely prevented growth at 10 mg. in the petri dish test. The controls were as in Example X.

Example XIII

One method of using a herbicide is to apply it to the soil before the weeds emerge. A toxic layer is formed which either prevents germination of the weed seeds or kills the very young plants before they can become established.

Five species of seeds were chosen for this test; namely, wheat, radishes, mustard, rye grass, and cucumbers. All of these germinate rapidly and emerge within three days from planting. Soil was packed in five pots and about 25 wheat kernels were planted in the first, 25 radish seeds in the second, 50 mustard seeds in the third, 50 rye grass seeds in the fourth and 10 cucumber seeds in the fifth pot. Ten grams of dry, pulverized soil containing 0.1 gram of 2,3,4,5-bis-($\Delta^2$-butenylene)-tetrahydrofurfural intimately commingled therewith was carefully distributed over the seeds in each of the five pots. (One-tenth gram of chemical in a four inch pot is approximately equal to 100 pounds per acre.) Additional sifted, untreated soil was then applied to completely cover the seeds. The pots were watered from the bottom by pouring water into metal trays in which the pots had previously been placed. Enough water was used to keep the soil damp on the surface.

The number of emerged plants and their size in comparison to the untreated check was recorded. This value is called the growth ratio and was used in the following formula in calculating the growth factor (F).

$$\frac{(\text{Number emerged}) (\text{growth ratio})}{\text{Number growing in check}} = F$$

The values at the end of one week were used since very nearly all the seeds that were going to sprout had done so. Growth factors for the respective seed species are recorded below.

| | Growth Factor [1] | | | | |
|---|---|---|---|---|---|
| | Wheat | Radish | Mustard | Rye Grass | Cucumber |
| 2,3,4,5-bis (Δ²-butenylene)-tetrahydrofurfural | 0 | 0 | 0.3 | 0.02 | 0.03 |

[1] The growth factor of an untreated check is 1.0.

Example XIV

The method of Example XIII was employed to test a sample of a sodium salt of the carboxylic acid of 2,3,4,5-bis (Δ²-butenylene)-tetrahydrofurfural. The sample was different from that tested in the earlier examples but was prepared in the same way, by the method described in Example VIII. The results of the tests were:

| | Growth Factor [1] | | | | |
|---|---|---|---|---|---|
| | Wheat | Radish | Mustard | Rye Grass | Cucumber |
| Sodium salt of carboxylic acid of 2,3,4,5-bis (Δ²-butenylene)-tetrahydrofurfural | 0.2 | 0.008 | 0.003 | 0.06 | 0.2 |

Example XV

Defoliation of cotton plants was attempted with 2,3,4,5-bis (Δ²-butenylene)-tetrahydrofurfural. The test plants were big and bushy, about 3 feet high, with lovely rich green leaves. The bolls were unopened at the time of test.

A 5% emulsion of 2,3,4,5-bis (Δ²-butenylene)-tetrahydrofurfural in water was made up, using as emulsifying agent ½% of Triton X-100, a non-ionic polymeric alkyl-aryl polyether alcohol. Sufficient emulsion was sprayed on the leaves to leave them just wet. After one week, all of the leaves had turned brown, and the leaves were coming loose and some falling within two weeks.

Example XVI

A so-called tar phase obtained from a process wherein butadiene and furfural are contacted under conditions forming polycyclic reaction products was fractionally distilled under vacuum to obtain various cuts. The following fractions had the boiling ranges shown, and contained varying quantities of 2,3,4,5-bis (Δ²-butenylene)-tetrahydrofurfural.

| Fraction | Temperature, °C. | Mm. Hg |
|---|---|---|
| A | 109–125 | 0.6–2.0 |
| B | 117–132 | 1.1–3.7 |
| C | 130 | 1.0 |

Tests on young bean plants were conducted by the method of Example VII, except that 10 mg. of the fraction being tested was mixed with the 0.5 g. lanolin. Results were as follows:

| Fraction | Plant Injury | | | | | | | | |
|---|---|---|---|---|---|---|---|---|---|
| | After 6 Hours | | | After 24 Hours | | | After 48 Hours | | |
| | Leaf | Stem | Petiole | Leaf | Stem | Petiole | Leaf | Stem | Petiole |
| A | Slight | 0 | 0 | Moderate | 0 | 0 | Severe | Very Slight | Very Slight |
| B | Severe | 0 | 0 | Severe | 0 | Bent | Very Severe | 0 | Bent |
| C | Moderate | 0 | 0 | Severe | 0 | Bent | Severe | 0 | Bent |

The sprouting rice test of Example IX as described above was conducted on fractions A, B, and C with the following results:

| Fraction | Growth Ratio | | | | | |
|---|---|---|---|---|---|---|
| | 5 mg. | | 1 mg. | | 0.1 mg. | |
| | Stem | Root | Stem | Root | Stem | Root |
| A | 0 | 0 | 1.0 | .5 | 1.0 | 1.0 |
| B | 0 | 0 | 1.0 | 1.0 | .8 | 1.0 |
| C | 0 | 0 | .7 | .5 | .7 | .8 |

Example XVII

The tests on defoliation of cotton described in Example XV were made in the field. Cotton defoliation tests were also carried out in the laboratory, using an emulsion of 2,3,4,5-bis(Δ²-butenylene)-tetrahydrofurfural made up from the same materials and in the same strength and applied in the same way as in Example XV. Complete leaf drop was effected in seven days.

We claim:

1. A method of inhibiting the growth of undesired plants which comprises contacting same with enough of a 2,3,4,5-bis(Δ²-butenylene)-tetrahydrofurfural to inhibit growth.

2. A method of defoliating plants which comprises applying to the leaves thereof only sufficient of a 2,3,4,5-bis(Δ²-butenylene)-tetrahydrofurfural to cause dropping of the leaves.

3. A herbicidal composition comprising up to ten weight per cent of 2,3,4,5-bis(Δ²-butenylene)-tetrafurfural dissolved in a non-paraffinic hydrocarbon solvent.

4. A herbicidal composition comprising up to ten weight per cent of 2,3,4,5-bis(Δ²-butenylene)-tetrahydrofurfural dissolved in a recycle cracked gas oil.

5. A herbicidal composition comprising up to ten weight per cent of 2,3,4,5-bis(Δ²-butenylene)-tetrahydrofurfural dissolved in a non-paraffinic naphtha.

6. A herbicidal composition comprising up to ten weight per cent of 2,3,4,5-bis(Δ²-butenylene)-tetrahydrofurfural in an aqueous emulsion.

7. A herbicidal composition comprising a polycyclic reaction product of a 1,3-butadiene compound with a furfural, containing a 2,3,4,5-bis(Δ²-butenylene)-tetrahydrofurfural, dissolved in a non-paraffinic hydrocarbon solvent.

8. A method of inhibiting the growth of undesired plants which comprises contacting same with enough 2,3,4,5-bis($\Delta^2$-butenylene)-tetrahydrofurfural to inhibit growth.

9. A method of defoliating plants which comprises applying to the leaves thereof only sufficient 2,3,4,5 - bis($\Delta^2$-butenylene)-tetrahydrofurfural to cause dropping of the leaves.

10. A method of killing plants which comprises thereto lethal doses of a material comprising a compound of the formula

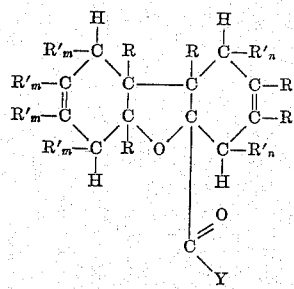

wherein R is selected from the group consisting of hydrogen, and methyl, $R'_m$ is selected from the group consisting of hydrogen, methyl and chloro, $R'_n$ is selected from the group consisting of hydrogen, methyl and chloro, at least one R is hydrogen, at least two $R'_m$ are hydrogen, at least two $R'_n$ are hydrogen, not more than one $R'_m$ is chloro, not more than one $R'_n$ is chloro, Y is selected from the group consisting of hydrogen, —OH and —OM, and M is an alkali metal; and chlorinated derivatives thereof containing not over 52 weight per cent total chlorine.

11. A herbicidal composition comprising a 2,3,4,5-bis($\Delta^2$ - butenylene)-tetrahydrofurfural in an aqueous emulsion.

12. A herbicidal composition comprising a 2,3,4,5-bis($\Delta^2$-butenylene)-tetrahydrofurfural admixed with a non-paraffinic hydrocarbon carrier.

13. A herbicidal composition comprising 2,3,4,5-bis($\Delta^2$ - butenylene)-tetrahydrofurfural admixed with a non-paraffinic hydrocarbon carrier.

14. A herbicidal composition comprising 2,3,4,5-bis($\Delta^2$-butenylene)-tetrahydrofurfural in an aqueous emulsion.

LYLE D. GOODHUE.
CAROLYN E. TISSOL.

REFERENCES CITED

The following references are of record in the file of this patent:

UNITED STATES PATENTS

| Number | Name | Date |
|---|---|---|
| 2,483,903 | Herbolsheimer | Oct. 4, 1949 |